350-3.61

XR 3,898,358

1 X 3032C

United States [Patent]

Ryan et al.

[11] 3,898,358

[45] Aug. 5, 1975

[54] HOLOGRAPHIC RECORDING MEDIA

[75] Inventors: Robert James Ryan, Trenton; Howard George Scheible, Livingston, both of N.J.

[73] Assignee: RCA Corporation, New York, N.Y.

[22] Filed: Aug. 18, 1972

[21] Appl. No.: 282,075

[52] U.S. Cl. ........................ 428/156; 204/4; 204/5; 204/6; 204/281; 350/3.5; 428/157; 428/172; 428/189; 428/192; 428/343; 428/424; 428/425; 428/480; 428/483; 428/522

[51] Int. Cl.$^{2}$.... G25D 1/10; G03H 1/00; B32B 3/02

[58] Field of Search .......... 161/231, 145, 116, 1, 2, 161/117, 118, 247, 256; 350/3.5; 117/234-238, 8, 10; 204/3-13, 281

[56] References Cited

UNITED STATES PATENTS

| | | | |
|---|---|---|---|
| 2,765,251 | 10/1956 | Williams | 161/231 |
| 2,892,747 | 6/1959 | Dye | 161/231 |
| 3,117,901 | 1/1964 | Chambers, Jr. | 161/231 |
| 3,565,978 | 2/1971 | Folger et al. | 204/6 |
| 3,577,323 | 5/1971 | Pichel | 204/281 |
| 3,585,113 | 6/1971 | Morris, Jr. | 204/4 |
| 3,619,024 | 11/1971 | Frattarola | 204/4 |
| 3,627,625 | 12/1971 | Jarrett | 161/231 |
| 3,656,998 | 4/1972 | Ottmann et al. | 161/231 |
| 3,657,389 | 4/1972 | Caldwell et al. | 161/231 |
| 3,758,649 | 9/1973 | Frattarola | 264/1 |

*Primary Examiner*—George F. Lesmes
*Assistant Examiner*—Charles E. Lipsey
*Attorney, Agent, or Firm*—Glenn H. Bruestle; Birgit E. Morris

[57] ABSTRACT

A laminate suitable as a recording media for both holographic video and audio information comprising a planar, dimensionally stable substrate, such as an oriented polyethylene terephthalate film, having an adhesive layer thereon and an embossable and cuttable film bonded to the adhesive layer wherein the substrate and adhesive layers extend beyond the edges of the embossable film whereby improved adhesion of the film to an electroplated metal layer is provided.

9 Claims, 1 Drawing Figure

3898358
OR IN 428/156

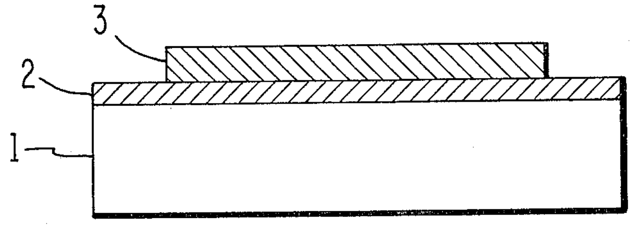

HOLOGRAPHIC RECORDING MEDIA

This invention relates to an improved holographic recording medium. More particularly, this invention relates to a recording medium which is embossable, cuttable and dimensionally stable during electroforming in which high quality holographic video and audio information can be recorded.

BACKGROUND OF THE INVENTION

Several processing steps are required for the preparation of a metal master tape containing both video information in the form of a three-dimensional holographic relief pattern, and audio information which has been cut by a stylus in conventinal manner, which can be employed for embossing a plurality of high quality replicas. In the holographic process as has been described by Bartolini et at., *Applied Optics*, Vol. 9, No. 10 pp. 2283–2290, the video information to be recorded is exposed into a photosensitive medium coated onto a substrate, such as a photoresist coating on a plastic film, which is then developed in known manner to form a three-dimensional phase grating on the surface of the substrate. A metal master is then prepared by electroforming a metal replica of the original developed film. A thermoplastic replica of the video information is then formed from the metal master by embossing and audio information is cut into the replica. The last two steps, i.e., those of forming a metal master and embossing a thermoplastic replica, are then repeated to form a final replica containing both video and audio information thereon.

Requirements for the thermoplastic material in which both video and audio information is to be recorded are stringent. The material must have good embossability so that no loss of the video information occurs during the transfer from the metal to the substrate, and so that no noise is added to the record information, it must have good cuttability in order to allow low noise, accurate audio information to be added; and it must be dimensionally stable and chemically inert to the conditions employed during the subsequent metal electroforming step. A single material able to meet all of these requirements is not known. Vinyl tape or cast vinyl film, for example, which has good embossability and which can be mechanically cut, expand under the conditions employed in an electroforming process, resulting in distortion of the recorded information. Other materials such as lacquers, commonly employed for mechanically cutting audio information, cannot be adequately embossed with the fine phase grating cntaining the holographic video information. Thus, a recording material which has excellent embossability and cuttability and which is also stable during metal electroforming has long been sought for a commercial quality holographic recording containing both audio and video information.

SUMMARY OF THE INVENTION

We have discovered that a laminate comprising a planar substrate which is inert and dimensionally stable to electroforming conditions bonded to an embossable film by means of an adherent coating, satisfies the above discussed requirements for a holographic, recording medium. In a preferred embodiment, the coated substrate extends beyond the edges of the embossable film, thereby providing a stepped edge which improves the flatness of metal masters electroformed from the laminate, and further, provides guidance during the final embossing step.

BRIEF DESCRIPTION OF THE FIGURE

The FIGURE is a cross-sectional view of a laminate of the invention.

DETAILED DESCRIPTION OF THE INVENTION

The substrate useful to make the present laminates must be planar and must be chemically inert and dimensionally stable during the conditions employed in electroforming a metal master from the laminate. If is preferred that the substrate be optically clear as well, so that the information recorded in the laminate can be read out prior to electroforming to determine whether the information recorded meets minimum standards. As an example, optical quality, biaxially oriented linear polyethylene terephthalate film or tape meets the standard required. Polyethylene terephthalate tape is commercially available in various widths and thicknesses from polyethylene terephthalate or modified polyethylene terepthalate. A suitabale tape for use in the invention is 16 mm wide and about 0.004 inch thick.

The bonding layer can be any adhesive which will bond both to the substrate and to the embossable film and will not degrade during the subsequent electroforming step. In addition, when the substrate is optically clear, the adhesive should provide an optically clear film as well. Suitable adhesives for polyethylene terephthalate substrates include aliphatic thermoplastic polyester-based urethane coating resins and thermoplastic linear polyesters. Illustrative adhesives include PE–200 polyester, a polyester believed to be a reaction product of ethylene glycol, terephthalic acid and sebacic acid, having a molecular weight in the range of about 20,000 to 30,000 commercially available from Goodyear Chemical Company. Polyurethane coating resins, such as ALFA–841, commercially available from Baker Castor Oil Company, Division of National Lead Company, or the Vithane polyurethanes, commercially available from Goodyear Chemical Company are also suitable. Although the bonding resin can be applied from the melt, preferably it is dissolved in a suitable solvent. In addition to suitable solvents, the adhesive can contain plasticizers, stabilizers and the like. When a polyester is employed as the adhesive, a small amount, i.e. up to about 10% by weight of the polyester, of a vinyl chloride polymer, such as a copolymer of vinyl chloride and vinyl acetate, is preferably added to improve the adhesion to the embossable film.

The bonding resin is applied to the substrate from solution in any convenient manner, such as with a doctor blade, by roller coating, spray coating and the like, to apply a uniform layer onto the substrate, which, when dried, is about 2 microns in thickness. The amount and type of the solvent employed is not critical. Sufficient solvent is added to the resin to provide a solution viscosity suitable for the particular manner of application. For example, application by roller coating requires a viscosity of from about 5–10 centipoises, whereas doctor blade coating requires a somewhat heavier viscosity, on the order of about 100 centipoises, as will be known to one skilled in the art. The solvent is then removed by evaporation. Suitable solvents will depend on the solubility of the bonding resin employed and are well known.

The embossable film, in addition to being readily embossable, must be able to be cut with a stylus or other instrument using conventional audio techniques and also must be chemically inert during the electroforming step. Cast vinyl films have been found suitable for the present laminates, particularly optical quality films which have very smooth surfaces. Plasticized polyvinyl chloride films can be used, as well as copolymers thereof such as copolymers of vinyl chloride with vinyl acetate, vinyl chloride and the like. These polymers and copolymers can contain up to about 20% by weight of polyester or acrylic plasticizers. In the preferred embodiment of the present laminates, the film will be narrower in width than the substrate film. A suitable film for use in the invention is 14 mm wide and from about 0.0015 to about 0.002 inch thick.

After the bonding resin has been applied to the substrate and the solvent removed if one is employed, the coated substrate, the embossable film, and the preheated metal embossing master are guided and pressed together. Thus bonding of the embossable film to the substrate and embossing of the film with holographic information from the metal master are preferably accomplished in one operation. The resultant laminate now having embossed video information therein is now ready for the audio information to be cut in, if desired, using conventional techniques.

By means of the stepped laminates of the invention there is provided a recording medium having a surface of excellent embossability and cuttability on which commercial quality video and audio information can be recorded, but one which can be electroplated to form a metal master without distortion or loss of the recorded information. The unique stepped design of the preferred laminate wherein the coated substrate extends beyond the embossable film, provides an adhesive surface which provides improved adhesion of the film to the plated metal during the electroforming step and thus prevents premature separation of the metal from the laminate during plating.

Referring now to the Figure, a substrante film 1 has a bonding layer 2 on one side thereof. A narrower embossable film 3 is bonded to the bonding layer 2.

The invention will be further illustrated by the following examples, but it is to be understood that the invention is not meant to be limited to the details described therein. In the examples, parts and percentages are by weight.

EXAMPLE 1

An oriented polyethylene terephthalate 16 mm film, 0.004 inch thick was roller coated with a bonding layer prepared by stirring together 9 parts of a 7% solution of a linear polyester available commercially as PE–200 having an acid number of 1.68, intrinsic viscosity of 0.59 and Ring and ball softening point of 163°C. in cellosolve acetate and one part of a 7% solution of VYNS resin in tetrahydrofuran. VYNS is a copolymer of 90% polyvinyl chloride and 10% polyvinyl acetate having an intrinsic viscosity of 0.754 and number average molecular weight of about 35,000, available commercially from Union Carbide Corporation.

The coated tape and a 14 mm vinyl film about 0.0015 inch thick, commercially available as C–102 from Dayco Corporation, were fed at a rate of one-half inch per second so as to center the vinyl film with respect to the coated tape to a drum having a nickel master thereon, preheated to 140°C. The tape and film were both pressed against the master so that the vinyl film was in contact with the master under 40 psi pressure. Thus bonding of the laminate and embossing were done simultaneously.

Audio information was next cut along the edge of the vinyl side of the embossed laminate tape with a stylus using conventional techniques.

The resultant laminate, now having both embossed video and audio information thereon, was used to make a metal master by electroforming. A first electroless nickel plate was applied following the technique of Feldstein given in *RCA Review*, June, 1970, pp 317 et. seq. and then a further nickel layer was electroplated using a conventional nickel sulfamate plating bath.

The laminate prepared as above performed excellently to form a flat, undistorted nickel master having both the video and the audio information. There was no degradation of the video or audio information, no loss in signal to noise ratio and no added noise detected.

EXAMPLE 2

The procedure of Example 1 was followed except using a different bonding formulation which contained 17% of PE–200 polyester, 3% of VAGH, a terpolymer containing 89.5% of vinyl chloride, 5.0% of vinyl acetate and 5.5% of vinyl alcohol available from Union Carbide Corporation, 26% of methyl ethyl ketone, 39% of toluene and 15% of cellosolve acetate and applying the adhesive with a doctor blade.

Excellent bonding to the cast vinyl film was obtained.

EXAMPLE 3

The procedure of Example 1 was repeated except substituting as the bonding layer, a solution of 100 parts of an aliphatic, thermoplastic polyurethane coating resin solution, available commercially as ALFA–841, in 360 parts of cellosolve.

Excellent bonding to the cast vinyl film was obtained.

We claim:

1. A holographic recording medium of a laminate which comprises a planar, dimensionally stable substrate of a biaxially oriented polyethylene terephthalate film, a coextensive adhesive layer which will not degrade during a subsequent electroforming step bonded thereto and an embossable, cuttable vinyl polymer film bonded to the adhesive layer having holographic information in the form of a three dimensional relief pattern and cut audio information on the outside surface of the film wherein the substrate and adhesive layers extend beyond the edges of the embossable film whereby improved adhesion of the film to an electroplated metal layer is provided.

2. A laminate according to claim 1 wherein the substrate, the adhesive layer and the embossable film are optically clear.

3. A laminate according to claim 1 wherein the embossable film is a cast vinyl film.

4. A laminate according to claim 3 wherein the cast vinyl film is a vinyl chloride/vinyl acetate copolymer.

5. A laminate according to claim 3 wherein the adhesive layer is an aliphatic thermoplastic polyester-based urethane coating resin.

6. A laminate according to claim 3 wherein the adhesive layer is a linear polyester.

7. A laminate according to claim 6 wherein the linear polyester is a polymer of ethylene glycol, terephthalate acid and sebacic acid.

8. A laminate according to claim 7 wherein the linear polyester is admixed with up to about 10% by weight of a vinyl chloride polymer.

9. A laminate according to claim 8 wherein the vinyl chloride polymer is a polymer of vinyl chloride and vinyl acetate.

* * * * *